Dec. 21, 1965  H. J. WOOD  3,224,186
BINARY INTERNAL COMBUSTION ENGINE
Filed April 23, 1962  2 Sheets-Sheet 1

INVENTOR.
Homer J. Wood
BY
ATTORNEYS

INVENTOR.
Homer J. Wood 3,224,186
BINARY INTERNAL COMBUSTION ENGINE
Homer J. Wood, Sherman Oaks, Calif., assignor to Continental Aviation and Engineering Corporation, Detroit, Mich., a corporation of Virginia
Filed Apr. 23, 1962, Ser. No. 189,596
4 Claims. (Cl. 60—13)

This invention relates to internal combustion engines and more particularly to such an engine provided with means whereby water and steam is employed as a working fluid.

The idea of utilizing water and steam as working fluids by mixing them with the air and/or combustion products of an internal combustion engine is not new in and of itself. Heretofore, however, such work has been limited to positive displacement engines wherein it has been providing such an engine with water injection at proper points of the combustion cycle substantially eliminates the need for cooling fins or water jackets and consequently improved power output at higher efficiencies could be achieved. Such engines as heretofore contemplated, however, failed to utilize the full power potential of the water and steam injected and had the added disadvantage that large amounts of water had to be readily available since no provision was made for the recovery of the water injected into the engine.

It is an object of the present invention to improve the thermal efficiencies of internal combustion engines by providing a system for injecting water into the air and/or combustion products of such an engine.

It is yet another object of the present invention to reduce the gas temperatures of internal combustion engines by injecting water into the combustion chamber of such engines.

It is still another object of the present invention to increase the percentage of power developed by the turbine member of a compound internal combustion engine by utilizing water and steam as added working fluids.

It is still a further object of the present invention to increase the B.M.E.P. of the reciprocating unit of a compound internal combustion engine by providing means injecting water into the combustion chamber of such an engine.

Still another object of the present invention is to increase the practical use of binary internal combustion engines by providing means to recover water injected into such engines and to provide regenerative functions.

Still a further object of the present invention is to increase the efficiency of binary internal combustion engines by providing means for preheating water injected into the inducted air of such engines.

Yet other objects and advantages will readily occur to one skilled in the art to which the invention pertains upon reference to the following drawings in which like characters refer to like parts throughout the several views and in which.

Figure 1:
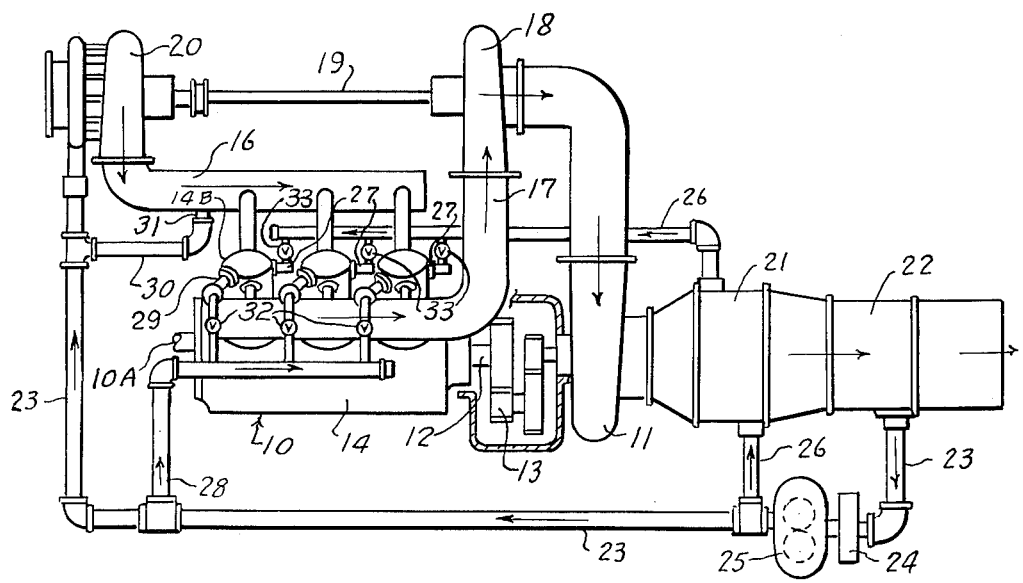
FIG. 1 is a side view of an internal combustion engine embodying the present invention.
Figure 3:
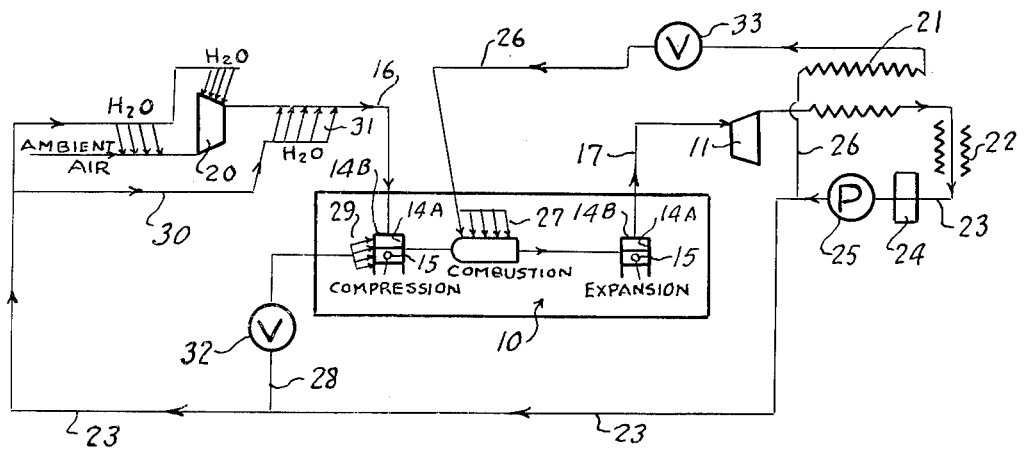
FIG. 3 is a diagrammatic view of the preferred embodiment of the present invention illustrated in FIG. 1 showing the water circuitry.

Now referring to the drawings for a more detailed description of the present invention, FIGS. 1 and 3 illustrate a preferred compound internal combustion engine as comprising a positive displacement member 10 and a power turbine member 11 operable to deliver power to an output shaft 10A or the like. The power turbine member 11 is connected to a power output shaft 12 by any means such as gears 13 so that power generated by the power turbine 11 is added to the power generated by the positive displacement member 10. Such an arrangement is commonly called a compound internal combustion engine.

The positive displacement member 11 of the compound internal combustion engine is provided with a cylinder block 14 carrying cylinders 14B each having a combustion chamber 14A, and a reciprocating piston 15. An intake manifold 16 and an exhaust manifold 17 are also provided. A compressor turbine 18 is operably connected into the exhaust manifold 17 and is provided with a shaft 19 drivingly connected to a compressor 20. The compressor 20 is operably connected into the intake manifold 16 to deliver compressed air to the combustion chambers 14A.

The power turbine 11 is preferably connected into the exhaust system downstream of the compressor turbine 18 as shown in FIG. 1 but it should be apparent that a single turbine could be used to perform the functions of driving the compressor and adding power to the positive displacement engine or that the order of position of these turbines might be changed without affecting the results achieved.

Exhaust gases pass from the power turbine 11 through a heat exchanger 21 and a condenser 22 connected in series with respect to exhaust gas flow.

A conduit 23 is connected to the condenser 22 and is provided with a filter 24 and pump 25 connected in series. The conduit 23 is preferably connected to the compressor 20. A branch conduit 26 passes through the heat exchanger 21 and is provided with a plurality of nozzles 27 positioned to inject water into the combustion chambers 14A. A second branch conduit 28 is connected to the conduit 23 and is provided with a plurality of nozzles 29 similar to the nozzles 27. The nozzles 29 are also positioned to inject water into the combustion chambers 14A. A third branch conduit 30 is connected to the conduit 23 and terminates in a nozzle 31 carried in the intake manifold 16.

In operation, water is injected into the inducted air and combustion products at several different points as will be described below. This produces water vapor in the exhaust gas stream. The condenser 22, which may be of any preferred type, cools the exhaust to a point at which the water vapor condenses and is extracted, for the recovery of substantially all of the water that has been previously injected. The pump 25 then re-circulates this water to be used again.

In the preferred embodiment of the invention illustrated in FIGS. 1 and 3, the water is directed to various points for injection into the inducted air and/or combustion products. First cool water is directed from the condenser 22 through the conduit 23 to the compressor 20. There it is injected into the inducted air at two different points as indicated in FIG. 3. The purpose of these injections is to keep the air saturated. Each time water is injected, the temperature of the inducted air is cooled considerably.

When the piston 15 moves upwardly on the compression stroke the air can take still more water and this is provided by the nozzles 29 connected to the branch conduit 28.

Another stream of water is directed by the pump 25 through the branch conduit 26 to the nozzles 27. The heat exchanger 21 disposed in the conduit 26 acts to utilize exhaust gases to preheat the water delivered to the nozzles 27. This water is injected into the combustion chamber 14a during the combustion of the fuel/air mixture as indicated in FIG. 3.

It is apparent that since the water is pumped through the heat exchanger 21 by the pump 25 and must be delivered to the nozzles 27 at a pressure greater than the pressure produced by the supercharger 20 to produce injection, the water as it picks up heat in the heat exchanger will do so at a pressure substantially higher than atmospheric pressure. The first injection into the combustion chamber reduces the work of compression by keeping the water saturated during movement of the piston 15 in its compression stroke while the second injection into the combustion chamber brings additional working fluid into the cycle after that working fluid has picked up exhaust heat. The valves 32 and 33 are timed by any means to provide injection into the combustion chambers 14A at the appropriate points in the power cycle.

Figure 2:
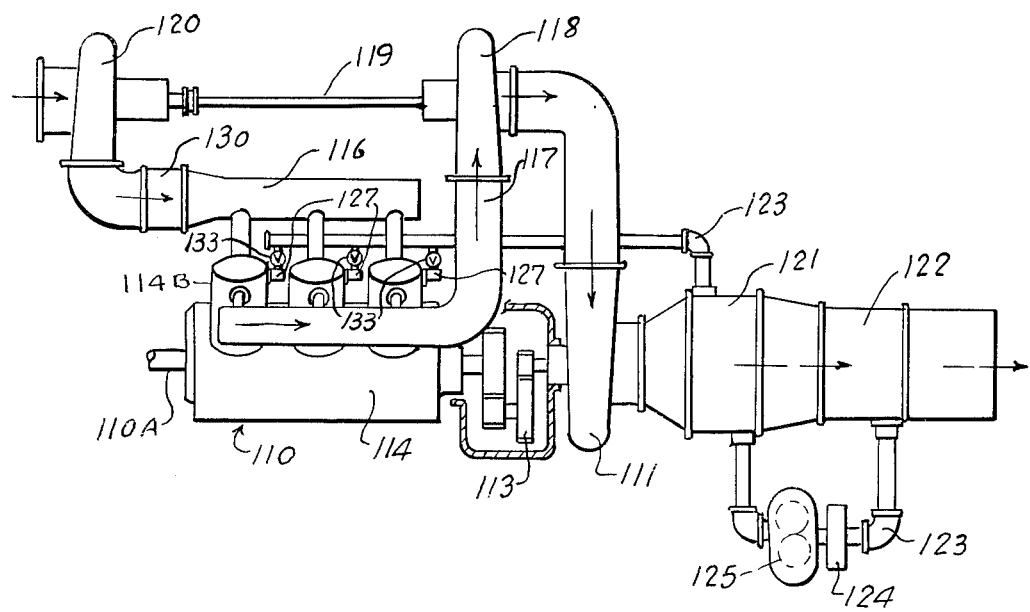
FIG. 2 is a side view of another preferred embodiment of the present invention.
Figure 4:
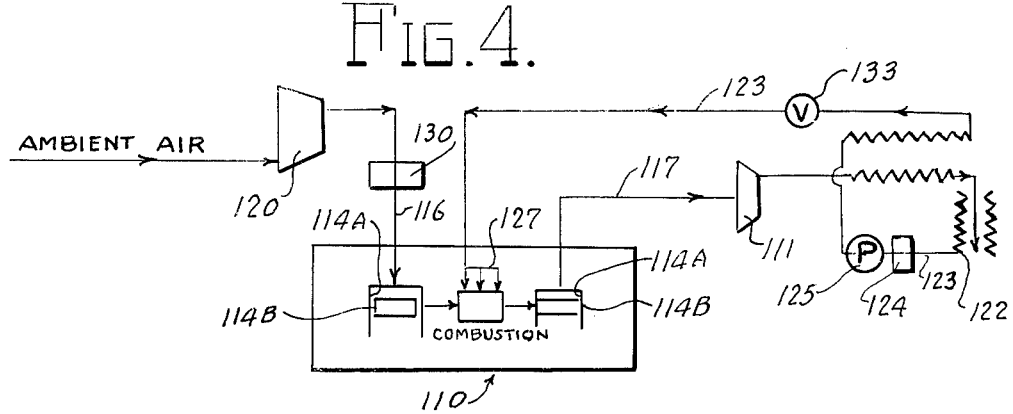
FIG. 4 is a diagrammatic view of the preferred embodiment of the present invention illustrated in FIG. 2 showing the water circuitry.

The preferred embodiment of the invention illustrated in FIGS. 2 and 4 is similar to the embodiment described above but eliminates the water injection into the compressed air. A combustion injection is provided and the compressed air is cooled by other means. As shown in FIG. 2, a positive displacement internal combustion engine 110 is provided with a cylinder block 114 carrying cylinders 114B each having a combustion chamber 114A. An air intake manifold 116 is connected to a compressor 120 and an exhaust manifold 117 is connected to a compressor turbine 118. A shaft 119 drivingly connects the compressor turbine 118 to the compressor 120. A power turbine 111 is connected into the exhaust system downstream of the compressor turbine 118. A heat exchanger 121 and a condenser 122 are connected into the exhaust system downstream of the power turbine 111. The power turbine 111 is geared to the positive displacement engine 110 essentially as described above by any means such as gears 113, and both thus serve to drive a power output shaft 110A or the like.

Water is collected from the exhaust gases by the condenser 122 and directed at a pressure greater than atmospheric by a pump 125 through a conduit 123, a filter 124, and through the preheater heat exchanger 121 to be delivered to nozzles 127. The nozzles 127 are operable to inject water into the combustion chambers 114A at the time combustion is taking place as indicated in FIG. 4. The valves 122 are timed to produce injection at the proper time. An after-cooler 130 of any preferred type is provided in the intake manifold 116 to cool the compressed air delivered by the compressor 120.

It should be noted that the present invention is not restricted to a compound engine and could be utilized with some variations with other types of power plants.

The added efficiency resulting from utilizing water injection in a compound engine as presently disclosed is apparent from the following table comparing similar engines with and without water injection. The preferred modification of the present invention as illustrated in FIGS. 1 and 3 has been labeled a "wet compression" engine for purposes of this table while the modification illustrated in FIGS. 2 and 4 has been labeled a "dry compression" engine:

|  | Compound engine without water injection | Dry compression | Wet compression |
| --- | --- | --- | --- |
| B.M.E.P. | 150 | 230 | 320 |
| Percent of power from cylinder | 94 | 81.5 | 45 |
| Efficiency percent | 54 | 51.5 | 59.2 |
| Maximum temperature of gases, °F | 4630 | 3600 | 3300 |
| Manifold pressure, p.s.i. | 100 | 100 | 100 |
| Exhaust manifold pressure/ intake manifold pressure | .42 | 1.00 | 2.65 |

It should be apparent that the present invention provides high thermal efficiencies and at the same time reduces the percentage of power taken from the cylinders. As much as 60% of the power is developed by the turbine, thus reducing the size of the power plant and keeping space and weight at a minimum.

It is further apparent that the present invention eliminates the problem of maintenance of a source of water for binary cycle engines. By condensing the water in the exhaust system and recirculating it, no make up water is needed. Although some water will escape in the exhaust, it has been found that water in the inducted air and water created by the combustion process is more than sufficient to make up for any losses through the exhaust system.

In the present stage of development, it is hard to say whether the primary advantage of this cycle is in improvement of thermal efficiency or in the reduction of power plant capital costs from the high ratio of turbine power to reciprocating engine power while maintaining the high B.M.E.P. in the reciprocating engine. Both are major areas of advantage. The latter is favorably influenced both by wet compression and by water injection during combustion.

It is still further apparent that many changes and modifications can be made without departing from the spirit of the present invention or the scope of the appended claims.

I claim:

1. In a compound internal combustion engine having a driven power output means, a combustion chamber and a piston drivingly connected to said power output means, an air induction system and an exhaust system, a turbine driven by exhaust gases delivered by said exhaust system and drivingly connected with said power output means, said air induction system including a compressor operable to deliver compressed air to said combustion chamber, a water injecting system comprising,
   (a) water recovering means connected downstream of said turbine and being operable to recover water from the exhaust gases,
   (b) a first injection means disposed in said air induction system downstream of said compressor and means conducting water from said water recovering means to said first injection means whereby water is injected into the compressed air prior to delivery to said combustion chamber to cool same,
   (c) a second injection means disposed in said combustion chamber, means conducting water from said water recovery means to said second injection means, and means actuating said second injection means only upon the compression stroke of said piston to deliver cool water to said combustion chamber,
   (d) a third injection means disposed in said combustion chamber, means conducting water from said water recovery means to said third injection means, and means actuating said third injection means only during combustion in said combustion chamber,
   (e) heat transfer means operable to recover heat from the exhaust gases, and
   (f) means delivering water from said water recovering means to said heat transfer means at a pressure higher than atmospheric pressure, and
   (g) means connecting said heat transfer means with said last mentioned conducting means whereby water delivered to said combustion chamber during combustion is preheated.

2. The compound internal combustion engine as defined in claim 1 and including a fourth injection means disposed in said air induction system upstream of said compressor and means conducting water from said water recovering means to said fourth injection means whereby water is injected into the air prior to delivery to said compressor to cool same.

3. The combination as defined in claim 2 and including a fifth injection means disposed in said compressor and means conducting water from said water recovering means to said fifth injection means whereby water is injected into the air during compression thereof to cool same.

4. In combination with a compound internal combustion engine having a driven power output means, a combustion chamber and a piston drivingly connected to said power output means, an air induction system and an exhaust system, a turbine driven by exhaust gases delivered by said exhaust system and drivingly connected with said power output means, said air induction system including a compressor operable to deliver compressed air to said combustion chamber, a water injecting system comprising (a) means for injecting water into said combustion chamber,
(b) water recovering means connected downstream of said turbine and being operable to recover water from the exhaust gases,
(c) heat transfer means disposed in said exhaust system between said turbine and said water recovery means and operable to absorb heat from the exhaust gases,
(d) means conducting water at a pressure greater than the pressures in said combustion chamber during ignition therein from said water recovering means and through said water injecting means whereby heated water is delivered to said water injecting means,
(e) means actuating said water injecting means to deliver heated water to said combustion chamber only during the firing stroke of said piston,
(f) a second water injecting means for injecting water into said air induction system downstream of said compressor,
(g) means conducting water directly from said water recovery means to said second water injecting means,
(h) a third water injecting means for injecting water into said combustion chamber,
(i) means conducting water directly from said water recovery means to said third water injecting means, and
(j) means operable to actuate said third water injecting means only during the compression stroke of said piston.

References Cited by the Examiner
UNITED STATES PATENTS

| | | | |
|---|---|---|---|
| 575,720 | 1/1897 | Ledent | 123—25.2 X |
| 1,147,085 | 7/1915 | Gray | 60—15 |
| 1,261,779 | 4/1918 | Dempsey | 123—25.2 |
| 1,433,185 | 10/1922 | Da Costa | 60—15 |
| 2,101,554 | 12/1937 | Meyer | 123—25.2 |
| 2,122,414 | 7/1938 | Foster | 123—25.1 |
| 2,352,267 | 6/1944 | Kelsey | 123—25.2 |
| 2,509,648 | 5/1950 | Mock | 123—25.1 |
| 2,622,390 | 12/1952 | Newton | 123—25.1 X |
| 2,748,562 | 6/1956 | Kauffman | 60—13 |
| 2,769,303 | 11/1956 | Lucia et al. | 60—13 |

FOREIGN PATENTS 504,518  7/1954  Canada.

MARK NEWMAN, *Primary Examiner.*

JULIUS E. WEST, EDGAR W. GEOGHEGAN,
*Examiners.*